United States Patent
Whittle et al.

(10) Patent No.: US 10,767,495 B2
(45) Date of Patent: Sep. 8, 2020

(54) TURBINE VANE ASSEMBLY WITH COOLING FEATURE

(71) Applicant: Rolls-Royce plc, London (GB)

(72) Inventors: Michael J. Whittle, London (GB); Paul Morrell, London (GB); Anthony Razzell, London (GB); Matthew Adams, London (GB)

(73) Assignee: Rolls-Royce plc, London ( * ) Notice: Subject to any disclaimer, the term of this patent is extended or adjusted under 35 U.S.C. 154(b) by 0 days.

(21) Appl. No.: 16/265,575

(22) Filed: Feb. 1, 2019

(65) Prior Publication Data

US 2020/0248569 A1    Aug. 6, 2020

(51) Int. Cl.
    *F01D 5/18*    (2006.01)
    *F01D 5/28*    (2006.01)
    *F01D 25/16*    (2006.01)

(52) U.S. Cl.
    CPC ............ *F01D 5/189* (2013.01); *F01D 5/284* (2013.01); *F01D 25/162* (2013.01); *F05D 2220/32* (2013.01); *F05D 2230/60* (2013.01); *F05D 2230/90* (2013.01); *F05D 2240/12* (2013.01); *F05D 2240/55* (2013.01); *F05D 2260/231* (2013.01); *F05D 2300/00* (2013.01)

(58) Field of Classification Search
    CPC .......... F01D 5/189; F01D 5/284; F01D 25/16; F01D 25/162; F05D 2230/90; F05D 2240/12; F05D 2240/126
    See application file for complete search history.

(56) References Cited

U.S. PATENT DOCUMENTS

| 5,078,576 | A | 1/1992 | Hayton |
| 5,149,250 | A | 9/1992 | Plemmons et al. |
| 5,681,144 | A | 10/1997 | Spring et al. |
| 5,797,726 | A | 8/1998 | Lee |
| 5,833,244 | A | 11/1998 | Salt et al. |
| 6,025,078 | A | 2/2000 | Rickerby et al. |
| 6,398,488 | B1 | 6/2002 | Solda et al. |
| 6,514,046 | B1 | 2/2003 | Morrison et al. |
| 6,586,115 | B2 * | 7/2003 | Rigney ................. C04B 35/486 416/241 B |
| 6,682,299 | B2 | 1/2004 | Bowen et al. |
| 7,182,576 | B2 | 2/2007 | Bunker et al. |
| 7,452,189 | B2 * | 11/2008 | Shi ......................... F01D 5/147 415/200 |
| 7,648,334 | B2 | 1/2010 | Hurst et al. |
| 7,824,152 | B2 * | 11/2010 | Morrison ................ F01D 9/042 415/135 |
| 8,216,687 | B2 | 7/2012 | Burd et al. |
| 8,740,554 | B2 | 6/2014 | Virkler et al. |
| 9,046,411 | B2 * | 6/2015 | Wang ...................... F01D 17/08 |
| 9,297,267 | B2 | 3/2016 | Itzel et al. |
| 9,353,643 | B2 | 5/2016 | Major |
| 9,527,262 | B2 | 12/2016 | Zhang et al. |
| 9,540,940 | B2 | 1/2017 | Liotta et al. |

(Continued)

*Primary Examiner* — Moshe Wilensky
*Assistant Examiner* — Christopher R Legendre
(74) *Attorney, Agent, or Firm* — Barnes & Thornburg LLP (57) ABSTRACT

A turbine vane assembly adapted for use in a gas turbine engine includes a support strut and a turbine vane arranged around the support strut. The support strut is made of metallic materials. The turbine vane is made of ceramic matrix composite materials to insulate the metallic materials of the support strut.

14 Claims, 3 Drawing Sheets

(56) References Cited

U.S. PATENT DOCUMENTS

| | | | |
|---|---|---|---|
| 9,638,057 B2 | 5/2017 | Kwon | |
| 9,677,167 B2 | 6/2017 | Bochiechio | |
| 9,719,363 B2 | 8/2017 | Pack et al. | |
| 9,915,151 B2 | 3/2018 | Weaver et al. | |
| 9,920,417 B2 | 3/2018 | Porob et al. | |
| 10,094,239 B2* | 10/2018 | Freeman | F01D 25/005 |
| 10,094,285 B2* | 10/2018 | Munshi | F02C 7/12 |
| 2010/0047615 A1 | 2/2010 | Carter et al. | |
| 2010/0247329 A1 | 9/2010 | Morgan | |
| 2016/0040281 A1 | 2/2016 | Trubelja et al. | |
| 2016/0230593 A1* | 8/2016 | Zelesky | F01D 5/189 |
| 2017/0211395 A1 | 7/2017 | Heffernan et al. | |

* cited by examiner

TURBINE VANE ASSEMBLY WITH COOLING FEATURE

FIELD OF THE DISCLOSURE

The present disclosure relates generally to vane assemblies for gas turbine engines, and more specifically to vanes that comprise ceramic-containing materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over aerofoils included in stationary vanes and rotating blades of the turbine. The interaction of combustion products with the aerofoils heats the aerofoils to temperatures that require the aerofoils to be made from high-temperature resistant materials and/or to be actively cooled by supplying relatively cool air to the vanes and blades. To this end, some aerofoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

A turbine vane assembly for a gas turbine engine may include a ceramic matrix composite vane, a metallic support strut, and a thermal barrier shield. The ceramic matrix composite vane may be adapted to conduct hot gases flowing through a primary gas path of the gas turbine engine around the turbine vane assembly during use of the turbine vane assembly. The metallic support strut may be configured to receive force loads applied to the ceramic matrix composite vane by the hot gases during use of the turbine vane assembly.

In some embodiments, the ceramic matrix composite vane may include an outer wall, an inner wall, and an aerofoil. The outer wall may define an outer boundary of the primary gas path. The inner wall may be spaced apart radially from the outer wall relative to an axis to define an inner boundary of the primary gas path. The aerofoil may extend between radially and interconnect the outer wall and the inner wall.

In some embodiments, the aerofoil may be formed to define an interior cavity that extends radially into the aerofoil. In some embodiments, the outer wall, the inner wall, and the aerofoil of the ceramic matrix composite vane are integrally formed from ceramic matrix composite materials such that the outer wall, the inner wall, and the aerofoil cooperate to form an integral, one-piece component.

In some embodiments, the metallic support strut may be located in the interior cavity formed in the aerofoil. The metallic support strut may have an outermost surface that faces the aerofoil. The outermost surface of the metallic support strut may be spaced apart from the aerofoil at all locations radially between the outer boundary and the inner boundary of the primary gas path to define a cooling channel between the metallic support strut and the aerofoil.

In some embodiments, the thermal barrier shield may be coupled to the outermost surface of the metallic support structure. The thermal barrier shield may be spaced apart from the aerofoil at all locations radially between the outer boundary and the inner boundary of the primary gas path to reduce an amount of heat transfer to the metallic support strut from radiant, conductive, and convective heating caused by a temperature difference between the ceramic matrix composite vane and the metallic support strut during use of the turbine vane assembly.

In some embodiments, the aerofoil may include an outer surface. The outer surface may define a leading edge, a trailing edge, a pressure side, and a suction side of the aerofoil.

In some embodiments, the thermal barrier shield may comprise gadolinium oxide. In some embodiments, the thermal barrier shield may be a low emissivity coating that has a reflectivity between about 0.5 and about 1. In some embodiments, the low emissivity coating may have a reflectivity between about 0.6 and 0.95.

In some embodiments, the thermal barrier shield may be a thermal barrier coating. The thermal barrier coating may reduce the radiant and convective heating caused by a temperature difference between the ceramic matrix composite vane and the metallic support strut.

In some embodiments, the turbine vane assembly may further include a seal. The seal may engage the aerofoil and the support strut to block fluid from flowing in the cooling channel.

According to an aspect of the present disclosure, a turbine vane assembly for a gas turbine engine may include a vane, a support strut, and a thermal barrier shield. The vane may include an outer wall having a radial inner surface, an inner wall having a radial outer surface, and an aerofoil that extends between radially and interconnects the outer wall and the inner wall. The aerofoil may be formed to define an interior cavity that extends radially into the aerofoil. The support strut may be located in the interior cavity formed in the aerofoil and may be spaced apart from the aerofoil at all locations radially between the radial inner surface and the radial outer surface to define a cooling channel between the support strut and the aerofoil. The thermal barrier shield may be located in the cooling channel and may be spaced apart from the aerofoil at all locations radially between the radial inner surface and the radial outer surface.

In some embodiments, the thermal barrier shield may extend radially entirely between the radial inner surface and the radial outer surface. In some embodiments, the thermal barrier shield may extend radially outward beyond the radial inner surface and radially inward beyond the radial outer surface.

In some embodiments, the support strut may include a spar and a load transfer feature. The spar may extend radially into the interior cavity. The load transfer feature may extend circumferentially away from the spar and may engage the aerofoil at a location radially outward of the radial inner surface. In some embodiments, the thermal barrier shield may be coupled to the spar of the support strut.

In some embodiments, the support strut may be completely solid and has a continuous outermost surface. The continuous outermost surface may be formed without holes.

In some embodiments, the thermal barrier shield may be continuous and formed without holes. The holes may extend either axially or circumferentially through the thermal barrier shield.

In some embodiments, the turbine vane assembly may further include a seal. The seal may engage the aerofoil and the support strut to block fluid from flowing into the cooling channel.

According to an aspect of the disclosure, a method of making a turbine vane assembly may include several steps. The method may include providing a metallic support strut, a ceramic matrix composite aerofoil formed to define an interior cavity therein, an outer wall, and an inner wall, coating an outermost surface of the metallic support strut with a thermal barrier coating to define an insulated region of the metallic support strut, locating the ceramic matrix composite vane radially between the outer wall and the inner wall relative to an axis, and arranging the metallic support strut in the interior cavity of the ceramic matrix composite aerofoil such that the insulated region of the metallic support strut extends radially at least between the outer wall and the inner wall and the thermal barrier coating is spaced apart from the ceramic matrix composite aerofoil at all locations in the insulated region.

In some embodiments, the method may include doping the thermal barrier coating with gadolinium to form gadolinium oxide. In some embodiments, the method may include arranging a seal between the metallic support strut and the ceramic matrix composite vane to block fluid from flowing into the cooling channel. In some embodiments, the method may include supplying the cooling channel with a flow of fluid from a cooling air source.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
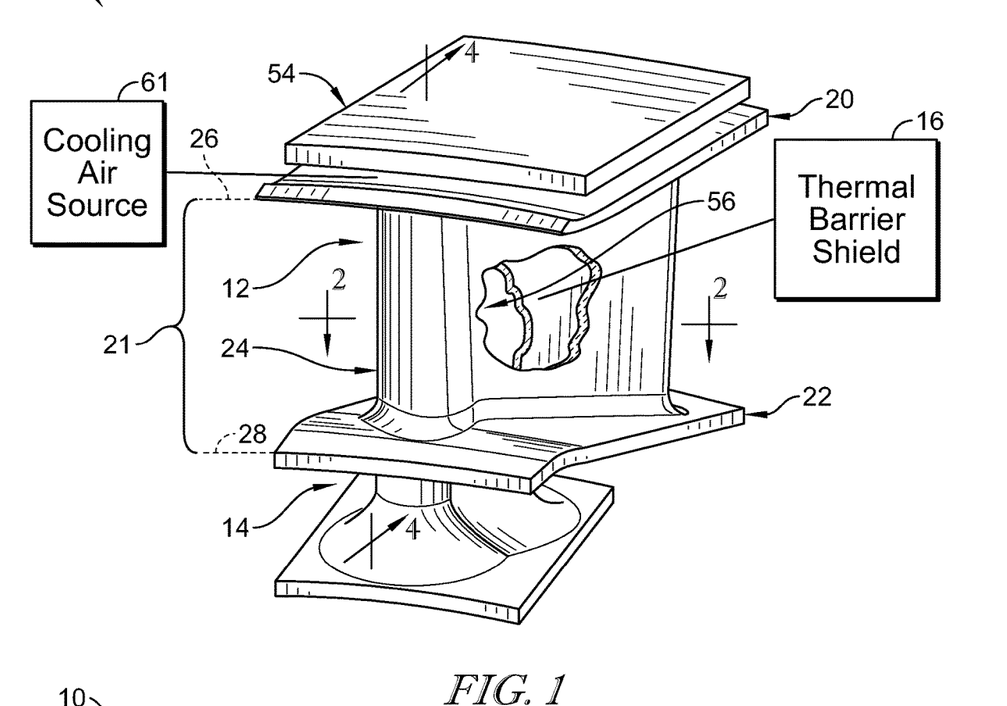
FIG. 1 is a perspective view of a turbine vane assembly in accordance with the present disclosure for use in a gas turbine engine with portions broken away to reveal that the turbine vane assembly includes a turbine vane, a support strut, and a thermal barrier shield located between the turbine vane and the support strut to reduce an amount of radiant, convective, and conductive heat transfer from the turbine vane to the support strut during use of the turbine vane assembly.

An illustrative turbine vane assembly 10 for use in a gas turbine engine is shown in FIG. 1. The turbine vane assembly 10 extends circumferentially partway about an axis 11 and includes a vane 12, a support strut 14, and a thermal barrier shield 16 as shown in FIGS. 1-4. The vane 12 is adapted to conduct hot gases flowing through a primary gas path 21 of the gas turbine engine around the turbine vane assembly 10 during use of the turbine vane assembly 10. The support strut 14 is located in an interior cavity 30 of the vane 12 and is configured to receive force loads applied to the vane 12 by the hot gases during use of the turbine vane assembly 10. The thermal barrier shield 16 is coupled to an outermost surface 60 of the support strut 14 and spaced apart from the vane 12 to reduce an amount of heat transfer to the support strut 14 from radiant, conductive, and convective heating caused by a temperature difference between the vane 12 and the support strut 14 during use of the assembly 10.

The vane 12 comprises ceramic matrix materials while the support strut 14 comprises metallic materials in the illustrative embodiment. The ceramic matrix composite vane 12 is adapted to withstand high temperatures, but may have relatively low strength compared to the metallic support strut 14. The metallic support strut 14 provides structural strength to the assembly 10 by receiving the force loads applied to the vane 12. The metallic support strut 14 may not be capable of withstanding the high temperatures experienced by the ceramic matrix composite vane 12.

The thermal barrier shield 16 is coupled to the support strut 14 to insulate the support strut 14 from the heat of the ceramic matrix composite vane 12. The thermal barrier shield 16 is configured to reduce the amount of radiant heat transferred from the vane 12 to the support strut 14. Illustratively, the thermal barrier shield 16 may reduce the amount of convective heat transferred from the vane 12 to the support strut 14. In some embodiments, the thermal barrier shield 16 may reduce the amount of conductive heat transferred from the vane 12 to the support strut 14 while in some embodiments conductive heat transfer is addressed with structural design choices.

The thermal barrier shield 16 is solid and formed without pores or holes in the illustrative embodiment. For example, the thermal barrier shield 16 forms a central passage that extends radially through the thermal barrier shield 16 to receive the spar 56, but the wall of the thermal barrier shield 16 is formed without radially, axially, or circumferentially extending holes.

In other embodiments, the thermal barrier shield 16 may be formed with pores or holes. For example, the thermal barrier shield 16 may act as an impingement tube such that the wall of the thermal barrier shield 16 may be formed with radially, axially, or circumferentially extending holes that fluidly connect to the cooling channel 62.

In the illustrative embodiment, the thermal barrier shield 16 is a low emissivity coating 16 that has a low transmissivity and low emissivity. In some embodiments, the low emissivity coating 16 may have a reflectivity of about 1 or less. In some embodiments, the low emissivity coating 16 may have a reflectivity of about 0.7 or less.

In some embodiments, the low emissivity coating 16 may have a reflectivity in a range of about 0.4 to about 0.95. In some embodiments, the low emissivity coating 16 may have a reflectivity in a range of about 0.4 to about 0.9. In some embodiments, the low emissivity coating 16 may have a reflectivity in a range of about 0.4 to about 0.85. In some embodiments, the low emissivity coating 16 may have a reflectivity in a range of about 0.4 to about 0.8.

In some embodiments, the low emissivity coating 16 may have a reflectivity in a range of about 0.5 to about 0.95. In some embodiments, the low emissivity coating 16 may have a reflectivity in a range of about 0.5 to about 0.9. In some embodiments, the low emissivity coating 16 may have a reflectivity in a range of about 0.5 to about 0.85. In some embodiments, the low emissivity coating 16 may have a reflectivity in a range of about 0.5 to about 0.8. In some embodiments, the low emissivity coating 16 may have a reflectivity in a range of about 0.5 to about 0.75.

In some embodiments, the low emissivity coating 16 may have a reflectivity in a range of about 0.6 to about 0.95. In some embodiments, the low emissivity coating 16 may have a reflectivity in a range of about 0.6 to about 0.9. In some embodiments, the low emissivity coating 16 may have a reflectivity in a range of about 0.6 to about 0.85. In some embodiments, the low emissivity coating 16 may have a reflectivity in a range of about 0.6 to about 0.80. In some embodiments, the low emissivity coating 16 may have a reflectivity in a range of about 0.6 to about 0.75.

In some embodiments, the low emissivity coating 16 may have a reflectivity in a range of about 0.7 to about 0.95. In some embodiments, the low emissivity coating 16 may have a reflectivity in a range of about 0.7 to about 0.9. In some embodiments, the low emissivity coating 16 may have a reflectivity in a range of about 0.7 to about 0.85. In some embodiments, the low emissivity coating 16 may have a reflectivity in a range of about 0.7 to about 0.8. In some embodiments, the low emissivity coating 16 may have a reflectivity in a range of about 0.75 and about 0.95.

In some embodiments, the low emissivity coating 16 may have a reflectivity in a range of about 0.8 and about 0.95. In some embodiments, the low emissivity coating 16 may have a reflectivity in a range of about 0.8 and about 0.9. In some embodiments, the low emissivity coating 16 may have a reflectivity in a range of about 0.6 and about 0.7. In some embodiments, the low emissivity coating 16 may have a reflectivity in a range of about 0.5 and about 0.7. In some embodiments, the low emissivity coating 16 may have a reflectivity in a range of about 0.4 and about 0.7.

In some embodiments, the low emissivity coating 16 may have a reflectivity in a range of about 0.5 to about 1. In some embodiments, the low emissivity coating 16 may have a reflectivity in a range of about 0.6 to about 1. In some embodiments, the low emissivity coating 16 has a reflectivity in a range of about 0.75 to about 1.0. In some embodiments, the low emissivity coating 16 may have a reflectivity in a range of about 0.7 to about 1.

In other embodiments, the low emissivity coating 16 may have a reflectivity in a range of about 0.8 to about 1. In some embodiments, the low emissivity coating 16 may have a reflectivity in a range of about 0.85 to about 1.0. In some embodiments, the low emissivity coating 16 may have a reflectivity in a range of about 0.9 to about 1.0. In some embodiments, the low emissivity coating 16 may have a reflectivity in a range of about 0.95 to about 1.0. In other embodiments, the low emissivity coating may have a reflectivity in a range of about 0.65 to 1. In other embodiments, the low emissivity coating 16 may have a reflectivity in a range of about 0.65 to about 0.95.

In some embodiments, the low emissivity coating 16 may have a reflectivity in a range of about 0.7 or more. In other embodiments, the low emissivity coating 16 may have a reflectivity of about 0.75 or less. In other embodiments, the low emissivity coating may have a reflectivity of about 0.8 or less. In other embodiments, the low emissivity coating may have a reflectivity of about 0.95 or less. In other embodiments, the low emissivity coating may have a reflectivity of about 0.65 or less.

In some embodiments, the low emissivity coating 16 may have a reflectivity in a range of about 0.6. In some embodiments, the low emissivity coating 16 may have a reflectivity of about 0.65. In some embodiments, the low emissivity coating 16 may have a reflectivity of about 0.7. In some embodiments, the low emissivity coating 16 may have a reflectivity of about 0.75. In some embodiments, the low emissivity coating 16 may have a reflectivity of about 0.80. In some embodiments, the low emissivity coating 16 may have a reflectivity of about 0.85. In some embodiments, the low emissivity coating 16 may have a reflectivity of about 0.9. In some embodiments, the low emissivity coating 16 may have a reflectivity of about 0.95.

In the illustrative embodiment, the thermal barrier shield 16 comprises gadolinium oxide. In other embodiments, the thermal barrier shield 16 may comprise other oxide forming species. The thermal barrier shield 16 has a low conductivity in some embodiments.

Figure 4:
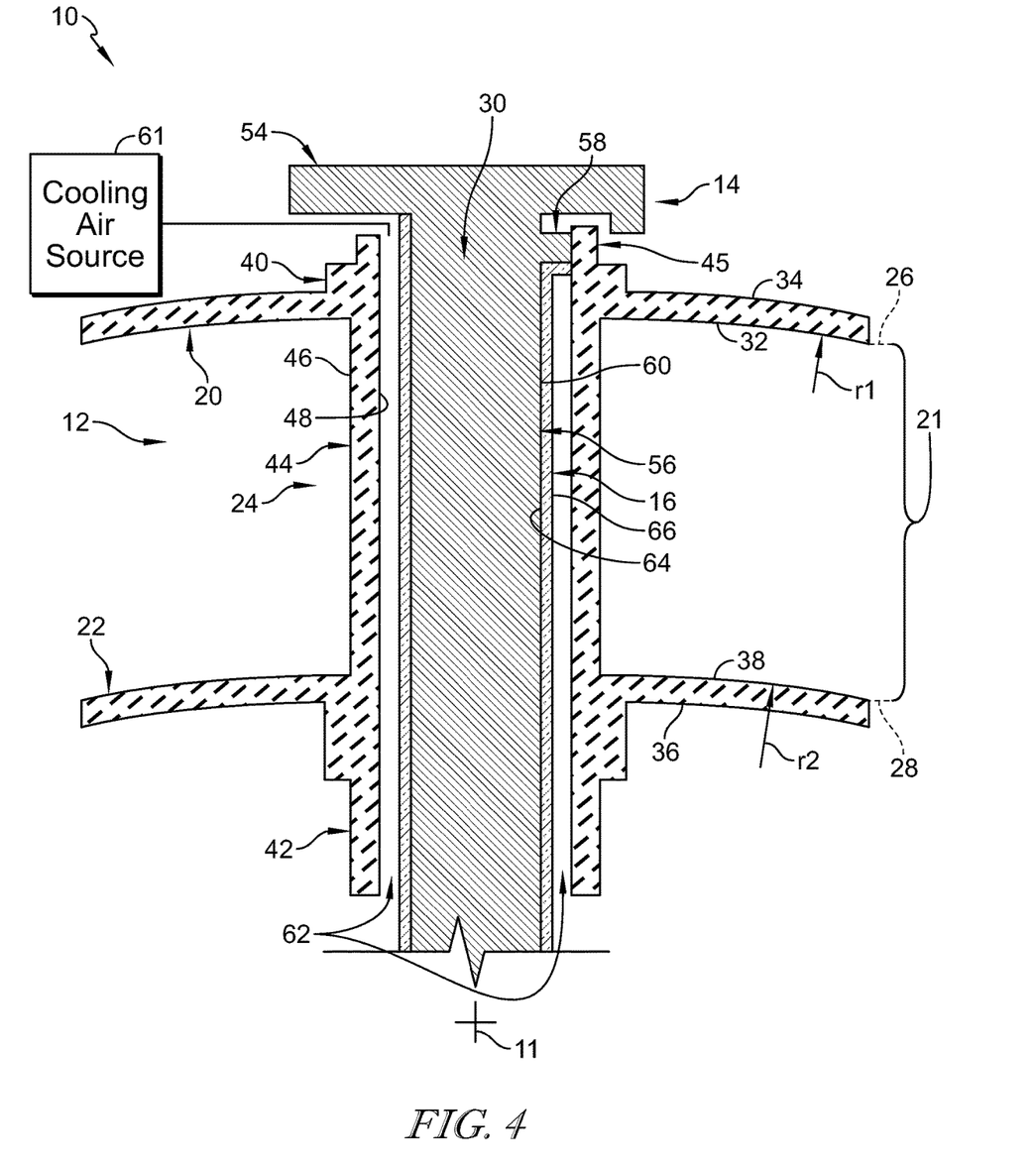
FIG. 4 is a cross-sectional view of the turbine vane assembly of FIG. 1 taken along line 4-4 showing that the metallic support strut of the turbine vane forms a cooling channel located between the support strut and the vane and showing that the thermal barrier coating extends radially along the entire length of the strut in the cooling channel.

The vane 12 includes an outer wall 20, an inner wall 22, and an aerofoil 24 as shown in FIGS. 1 and 4. The outer wall 20 defines an outer boundary 26 of the primary gas path 21. The inner wall 22 is spaced apart radially from the outer wall 20 relative to the axis 11 to define an inner boundary 28 of the primary gas path 21. The aerofoil 24 extends between radially and interconnects the outer wall 20 and the inner wall 22. The aerofoil 24 is shaped to redirect gases flowing through primary gas path 21 of the gas turbine engine and shield the support strut 14 from the hot gases in the primary gas path 21. The aerofoil 24 is also formed to define an interior cavity 30 that extends radially into the aerofoil 24.

In the illustrative embodiment, the outer wall 20, the inner wall 22, and the aerofoil 24 of the vane 12 are integrally formed from ceramic matrix composite materials. As such, the outer wall 20, the inner wall 22, and the aerofoil 24 are included in a single, integral, one-piece vane component 12 as shown in FIGS. 1-4. In other embodiments, the outer wall 20, the inner wall 22, and the aerofoil 24 may be formed as separate components.

The outer wall 20 includes a radial inner surface 32 and a radial outer surface 34 as shown in FIG. 4. The radial inner surface 32 is located at a first radius r1 relative to the axis 11 and faces the primary gas path 21. The radial outer surface 34 is spaced apart radially from the radial inner surface 32 and faces away from the primary gas path 21.

The inner wall 22 includes a radial inner surface 36 and a radial outer surface 38 as shown in FIG. 4. The radial outer surface 38 is located at a second radius r2 relative to the axis 11 and faces the primary gas path 21. The radial inner surface 36 is spaced apart from the radial outer surface 38 and faces away from the primary gas path 21.

The aerofoil 24 includes a radial outer end 40, a radial inner end 42, and a body 44 as shown in FIG. 4. The radial outer end 40 extends radially-outwardly past the outer wall 20 beyond the first radius r1, or the outer boundary 26, and outside the primary gas path 21 in the illustrative embodiment. The radial inner end 42 is spaced apart from the radial outer end 40 relative to the axis 11 and extends radially-inwardly past the inner wall 22 beyond the second radius r2, or the inner boundary 28, and outside the primary gas path 21. The body 44 extends radially entirely between the first radius r1 and the second radius r2 and interconnects the radial outer end 40 and the radial inner end 42.

The radial outer end 40 of the aerofoil 24 is shaped to form a load transfer tab 45 as shown in FIGS. 4-9. The load transfer tab 45 is located outside of the primary gas path 21 and is contacted by a load transfer feature 58 of the support strut 14 to transfer loads applied to the vane 12 to the metallic support 14 at the radial outer end 40 of the aerofoil 24 outside of the primary gas path 21.

Figures 2, 3:
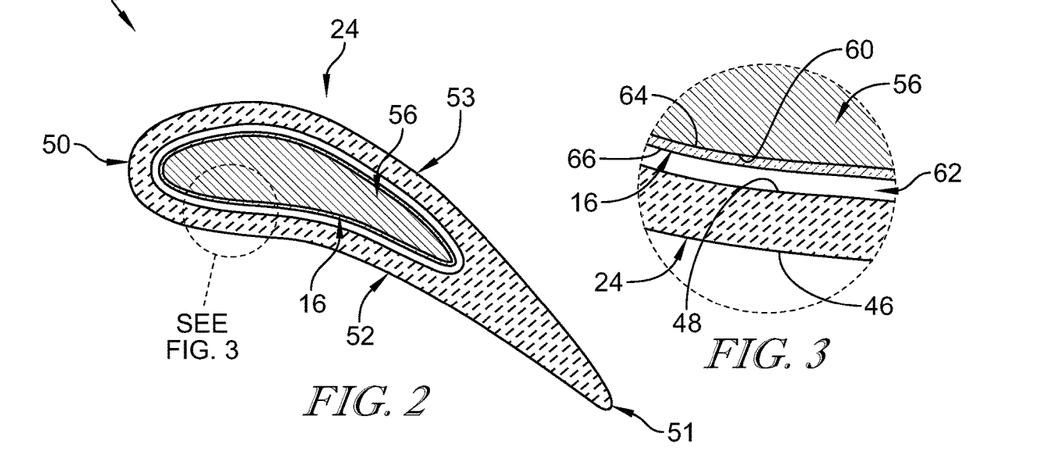
FIG. 2 is a cross sectional view of the turbine vane assembly of FIG. 1 taken along line 2-2 showing that the turbine vane comprises ceramic matrix composite materials, that the support strut comprises metallic materials, and that the thermal barrier shield is coupled to the strut and spaced apart from the vane at all locations in a primary gas path to insulate the strut.
FIG. 3 is a detail view of the turbine vane assembly of FIG. 2 showing that the thermal barrier shield is spaced apart from the vane to reduce the convective, conductive, and radiant heat transferred to the strut from the turbine vane during use of the turbine vane assembly.

The aerofoil 24 also includes an outer surface 46 and an interior surface 48 as shown in FIG. 3. The outer surface 46 faces the primary gas path 21 and extends between the radial inner surface 32 of the outer wall 20 and the radial outer surface 38 of the inner wall 22. The interior surface 48 is spaced apart from the outer surface 46 and defines the interior cavity 30 that extends radially through the aerofoil 24. The outer surface 46 and the interior surface 48 are continuous and formed without holes in the illustrative embodiment. In other embodiments, the outer surface 46 and the interior surface 48 are formed with holes that are fluidly connected to the interior cavity 30.

The outer surface 46 of the aerofoil 24 defines a leading edge 50, a trailing edge 51, a pressure side 52, and a suction side 53 of the vane 12 as shown in FIG. 2. The trailing edge 51 is axially spaced apart from the leading edge 50. The suction side 53 is circumferentially spaced apart from the pressure side 52. The pressure side 52 and the suction side 53 extend between and interconnect the leading edge 50 and the trailing edge 51.

The support strut 14 includes an outer mount panel 54, a spar 56, and the load transfer feature 58 as shown in FIGS. 1 and 4. The spar 56 extends radially-inwardly from the outer mount panel 54 relative to the axis 11 and into the interior cavity 30. In some embodiments, the spar 56 may be hollow to allow flow of cooling air through the spar 56. The load transfer feature 58 extends circumferentially away from the spar relative to the axis 11 and engages the load transfer tab 45 of the aerofoil 24 at a location radially outward of the first radius r1, or the outer boundary 26, and outside the primary gas path 21. The outer mount panel 54 may couple the support strut 14 with an engine case of the gas turbine engine.

In the illustrative embodiment, the outer mount panel 54, the spar 56, and the load transfer feature 58 are integrally formed from metallic materials such that the outer mount panel 54, the spar 56, and the load transfer feature 58 are included in a single, integral, one-piece solid support strut 14 component as shown in FIGS. 2-4. In other embodiments, the outer mount panel 54, the spar 56, and the load transfer feature 58 may be formed as separate components.

The spar 56 of the support strut 14 has an outermost surface 60 as shown in FIGS. 2-4. The outermost surface 60 of the spar 56 faces the interior surface 48 of the aerofoil 24 and is spaced apart from the aerofoil 24 at all locations radially between the outer boundary 26 and the inner boundary 28 of the primary gas path 21 to define a cooling channel 62 between the metallic support strut 14 and the aerofoil 24. As such, the outermost surface 60 is spaced apart from the interior surface 48 of the aerofoil 24 at all locations between the first radius r1 and the second radius r2.

In the illustrative embodiment, the spar 56 is solid and formed without pores or holes. As such, the outermost surface 60 is solid and formed without radially, axially, or circumferentially extending holes. In some embodiments, the spar 56 may be hollow to allow flow of cooling air through the spar 56 and transmit cooling air into an inter-disk cavity. In some embodiments, the spar 56 is formed to include holes to allow fluid to pass from inside the hollow spar 56 and into the cooling channel 62 and/or transmit cooling air to the vane 12.

In the illustrative embodiment, the cooling channel 62 is supplied cooling air from a cooling air source 61. The cooling air source 61 may be pressurized air from the upstream compressor. In other embodiments, the cooling air source 61 may be other suitable sources within the gas turbine engine.

The thermal barrier shield 16 includes an attachment surface 64 and a shield surface 66 as shown in FIGS. 2-4. The attachment surface 64 is coupled to the outermost surface 60 of the spar 56. The shield surface 66 is spaced apart from the attachment surface 64 and faces away from the outermost surface 60 of the spar 56 towards the interior surface 48 of the aerofoil 24. The shield surface 66 is spaced apart from the interior surface 48 of the aerofoil 24.

Additionally, the thermal barrier shield 16 extends radially entirely between the radial inner surface 32 of the outer wall 20 and the radial outer surface 38 of the inner wall 22. As such, thermal barrier shield 16 extends radially along the outermost surface 60 of the spar 56 at all locations between the first radius r1 and the second radius r2. In the illustrative embodiment, the thermal barrier shield 16 extends radially outward beyond the radial inner surface 32 of the outer wall 20 and radially inward of the radial outer surface 38 of the inner wall 22.

The thermal barrier shield 16 is spaced apart from the interior surface 48 of the aerofoil 24 at all locations between the first radius r1 and the second radius r2. The thermal barrier shield 16 is made of low emissivity materials to reduce the radiant heat transfer from the vane 12 to the support strut 14. An air gap is formed between the thermal barrier shield 16 and the vane 12 which may further reduce heat transfer from the vane 12 to the support strut 14.

In the illustrative embodiment, a portion of the thermal barrier shield 16 extends to and shields the load transfer feature 58 of the support strut 14. The thermal barrier shield 16 covers the load transfer feature 58 to reduce the radiative and convective heating to the load transfer feature 58 and the aerofoil 24 so that the load transfer feature 58 of the support strut 14 is shielded from the radiant and convective heating.

A method of making the turbine vane assembly 10 may include several steps. The method includes coating the outermost surface 60 of the spar 56 of the support strut 14 with the thermal barrier coating 16 to define an insulated region of the strut 14. The method also includes locating the vane 12 radially between the outer wall 20 and the inner wall 22 relative to the axis 11. The method includes arranging the support strut 14 in the interior cavity 30 of the aerofoil 24 of the vane 12 such that the insulated region of the strut 14 extends radially at least between the outer wall 20 and the inner wall 22 and the thermal barrier coating 16 is spaced apart from the aerofoil 24 of the vane 12 at all locations in the insulated region.

The method may further include doping the thermal barrier coating 16 with gadolinium to form gadolinium oxide. The method may also include supplying the cooling channel 62 with a flow of fluid from a cooling air source 61. The method may include blocking fluid from flowing in the cooling channel 62.

Another embodiment of a turbine vane assembly 210 in accordance with the present disclosure is shown in FIGS. 5-8. The turbine vane assembly 210 is substantially similar to the turbine vane assembly 10 shown in FIGS. 1-4 and described herein. Accordingly, similar reference numbers in the 200 series indicate features that are common between the turbine vane assembly 10 and the turbine vane assembly 210. The description of the turbine vane assembly 10 is incorporated by reference to apply to the turbine vane assembly 210, except in instances when it conflicts with the specific description and the drawings of the turbine vane assembly 210.

Figures 5, 6, 7, 8:
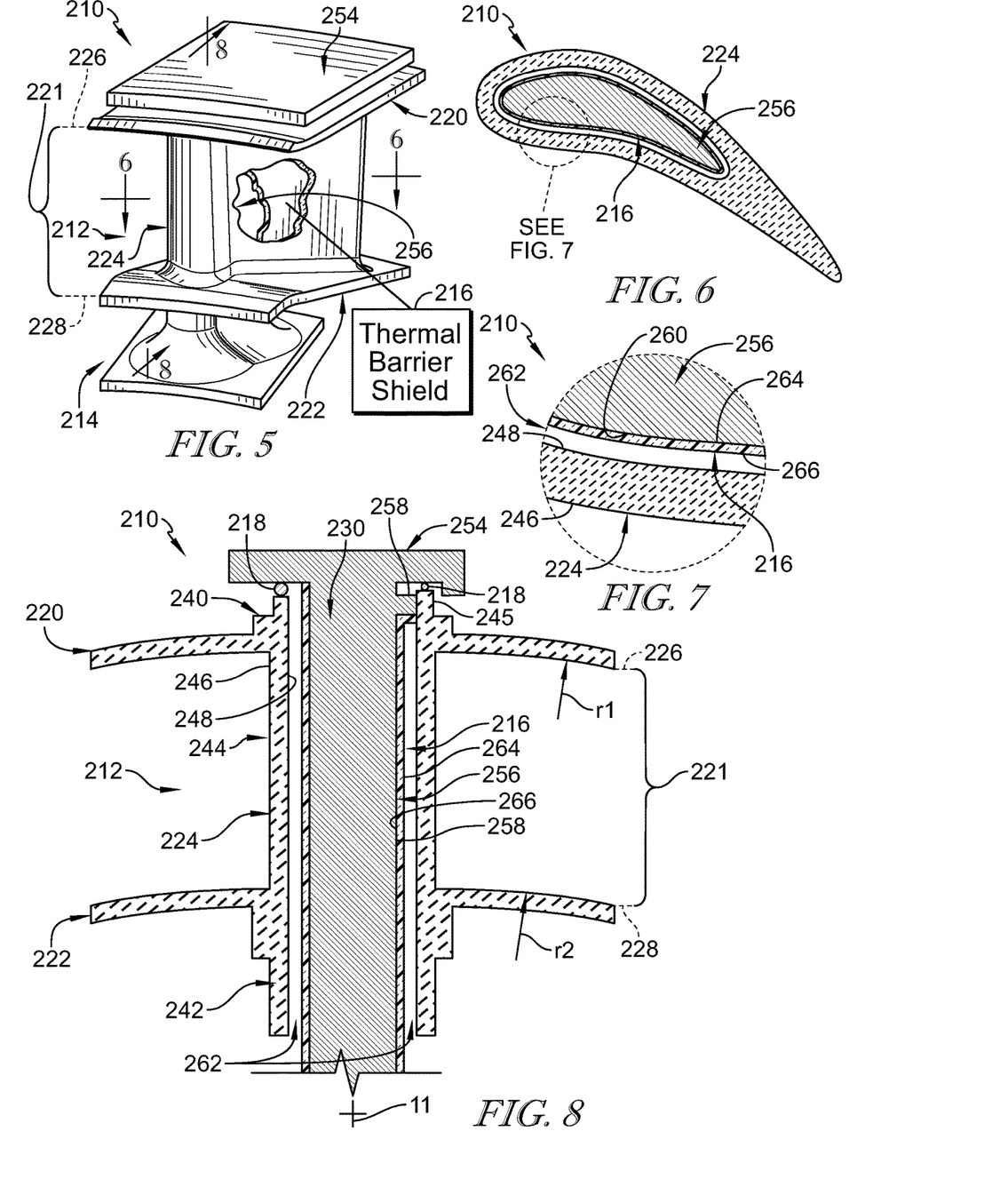
FIG. 5 is a perspective view of another turbine vane assembly in accordance with the present disclosure showing that the turbine vane assembly includes a turbine vane, a support strut, and a thermal barrier shield located between the vane and the support strut to reduce heat transfer to the support strut.
FIG. 6 is a cross sectional view of the turbine vane assembly of FIG. 5 taken along line 6-6 showing that the turbine vane comprises ceramic matrix composite materials, that the support strut comprises metallic materials, and that the thermal barrier shield is coupled to the strut and spaced apart from the vane at all locations in a primary gas path.
FIG. 7 is a detail view of the turbine vane assembly of FIG. 6 showing that the thermal barrier shield comprises materials configured to reduce heat transferred to the strut from the turbine vane.
FIG. 8 is a cross-sectional view of the turbine vane assembly of FIG. 5 taken along line 8-8 showing that the metallic support strut and the turbine vane form a cooling channel between the support strut and the turbine vane and showing that the turbine vane assembly further includes seals located in the cooling channel to block fluid flow and reduce convective heat transfer between the support strut and the turbine.

The turbine vane assembly 210 extends partway about a central axis for use in a gas turbine engine is shown in FIG. 5. The turbine vane assembly 210 includes a vane 212, a support strut 214, a thermal barrier shield 216, and a seal 218 as shown in FIGS. 5-8. The turbine vane assembly 210 is arranged so that the seal 218 blocks or limits fluid flow in a cooling channel 262 formed between the vane 212 and the thermal barrier shield 216 to reduce convective heat transfer as well as radiant heat transfer from the vane 212 to the support strut 214.

The vane 212 comprises ceramic matrix materials while the support strut 214 comprises metallic materials. The vane 212 is adapted to conduct hot gases flowing through a primary gas path 221 of the gas turbine engine around the turbine vane assembly 210 during use of the turbine vane assembly 210. The metallic support strut 214 is located in an interior cavity 230 of the vane 212 and is configured to receive force loads applied to the ceramic matrix composite vane 212 by the hot gases during use of the turbine vane assembly 210. The thermal barrier shield 216 is coupled to an outermost surface of the support strut 214 and spaced apart from the vane 212 at all locations radially between an outer boundary 226 and an inner boundary 228 of the primary gas path 221.

The thermal barrier shield 216 reduces an amount of heat transfer to the support strut 214 from at least radiant and convective heating caused by a temperature difference between the vane 212 and the support strut 214 during use of the assembly 210. In the illustrative embodiment, the thermal barrier shield 216 is a thermal barrier coating. The seal 218 engages an aerofoil 224 of the vane 212 and the support strut 214 to block fluid from flowing in a cooling channel 262.

In the illustrative embodiment, the thermal barrier coating 216 comprises a material with low conductivity and is also compatible with the metallic support strut 214. In some embodiments, the thermal barrier coating 216 is an air-plasma spray thermal barrier coating.

The vane 212 includes an outer wall 220, an inner wall 222, and the aerofoil 224 as shown in FIGS. 5 and 8. The outer wall 220 defines the outer boundary 226 of the primary gas path 221. The inner wall 222 is spaced apart radially from the outer wall 220 relative to an axis 11 to define an inner boundary 228 of the primary gas path 221. The aerofoil 224 extends between radially and interconnects the outer wall 220 and the inner wall 222. The aerofoil 224 is shaped to redirect air flowing through the gas turbine engine and shield the support strut 214 from the primary gas path 221. The aerofoil 224 is also formed to define the interior cavity 230 that extends radially into the aerofoil 224.

The aerofoil 224 includes a radial outer end 240, a radial inner end 242, and a body 244 as shown in FIG. 8. The radial outer end 240 extends radially-outwardly past the outer wall 220 and engages the seal 218 to seal between the support strut 214 and the radial outer end 240 of the aerofoil 224. The radial inner end 242 is spaced apart from the radial outer end 240 relative to the axis 11 and extends radially-inwardly past the inner wall 222. The body 244 extends radially entirely between and interconnects the radial outer end 240 and the radial inner end 242.

The support strut 214 includes an outer mount panel 254, a spar 256, and a load transfer feature 258 as shown in FIG. 8. The outer mount panel 254 engages the seal 218 to seal between the radial outer end 240 and the outer mount panel 254. The spar 256 extends radially-inwardly from the outer mount panel 254 relative to the axis 11 and into the interior cavity 230. The load transfer feature 258 extends circumferentially away from the spar 256 relative to the axis 11 and engages the load transfer tab 245 of the aerofoil 224 at a location radially outward of the radial inner surface 232 of the vane 212.

The thermal barrier shield 216 includes an attachment surface 264 and a shield surface 266 as shown in FIGS. 6-8. The attachment surface 264 is coupled to an outermost surface 260 of the spar 256. The shield surface 266 is spaced apart from the attachment surface 264 and faces opposite the outermost surface 260 of the spar 256 towards the interior surface 248 of the aerofoil 224. The shield surface 266 is spaced apart from the interior surface 248 of the aerofoil 224. The shield surface 266 faces the interior surface 248 of the aerofoil 224 to shield the spar 256 from at least radiative and convective heating from the aerofoil 224 of the vane 212 so that the spar 256 retains its structural integrity.

Additionally, the thermal barrier shield 216 extends radially entirely between the radial inner surface 232 of the outer wall 220 and the radial outer surface 238 of the inner wall 222. In the illustrative embodiment, the thermal barrier shield 216 extends radially outward beyond the radial inner surface 232 of the outer wall 220 and radially inward of the radial outer surface 238 of the inner wall 222.

In the illustrative embodiment, a portion of the thermal barrier shield 216 extends to and shields the load transfer feature 258 of the support strut 214. The thermal barrier shield 216 covers the load transfer feature 258 to reduce the radiative and convective heating to the load transfer feature 258 and the aerofoil 224 so that the load transfer feature 258 of the support strut 214 is shielded from the radiant and convective heating.

A method of making the turbine vane assembly 210 may include several steps. The method includes coating the outermost surface 260 of the spar 256 of the support strut 214 with a thermal barrier coating 216 to define an insulated region of the strut 214. The method also includes locating the vane 212 radially between the outer wall 220 and the inner wall 222 relative to the axis 11. The method includes arranging the support strut 214 in the interior cavity 230 of the aerofoil 224 of the vane 212 such that the insulated region of the strut 214 extends radially at least between the outer wall 220 and the inner wall 222 and the thermal barrier coating 216 is spaced apart from the aerofoil 224 of the vane 212 at all locations in the insulated region.

The method may further include doping the thermal barrier coating 216 with gadolinium to form gadolinium oxide. The method may also include arranging a seal 218 between the load transfer tab 245 and the outer mount panel 254 of the strut 214 to block fluid from flowing into the cooling channel 262.

The present disclosure related to methods to reduce radiative and convective heat transfer to a metallic spar 56, 256 used in a ceramic matrix composite (CMC) nozzle guide vane assembly 10, 210, for example, in the second stage high-pressure turbine. A low emissivity coating 16, 216 may be applied to the spar 56, 256 to shield the metal from the radiative heating effect. In other embodiments, a radiation barrier may be installed between the CMC vane 12, 212 and metal surfaces with high reflectivity to shield the metal from the radiative heating effect.

In instances when the CMC material needs convective cooling, the metal structure 14, 214 may need to be isolated from the fluid as it heats before exiting the CMC structure. A thermal barrier coating (TBC) 16, 216 may be applied to the spar 56, 256 to convectively cool the metal structure. The metal roughness of the outermost surface of the spar 56, 256 may be reduced to minimize the heat transfer coefficient and increase convective cooling. In such embodiments, the spar 56, 256 may be free of any coating or shield. The CMC-metal cavity may be designed to avoid accelerating the fluid.

In other embodiments, the vanes are metallic and do not need sparred supports and therefore do not need CMC cooling. However, the CMC cooling requirements may depend on the material temperature capability and engine cycle design.

Ceramic matrix composite materials may offer a higher temperature capability than conventional nickel based superalloys used in gas turbine engines. The CMC material may allow for a reduction in cooling air flow used and consequently an increase in thermal efficiency and therefore reduced fuel burn.

One component which may benefit from the substitution of nickel based superalloy with CMC materials is the second stage high pressure turbine nozzle guide vane. The vanes need to support an inter-stage seal and due to the relatively low strength of SiC/SiC CMC materials, a metallic support structure or spar may be used to transmit the axial loading applied to the inter-stage seal to the high-pressure turbine casing. Metallic nozzle guide vanes may be able to withstand the loading associated with the inter-stage seal loading without the need for a dedicated structure.

As the temperature capability of the CMC material increases the integrity and durability of the metallic support structure may decrease. The strength of the metal may reach a break-point where the material is insufficiently capable of tolerating the stresses. Additionally, the modulus of the metal structure decreases with temperature and drives a larger deflection relative to the CMC material, potentially overloading the CMC structure.

Regardless of the CMC material capability, there may be a non-trivial radiative heat load that is inputted to the metallic spar. The radiative heat load may increase exponentially with CMC operating temperature. The exponentially increasing radiative heat load may be an issue in the high pressure stage 2 turbine application, as the metal structure exists wholly within the very hot CMC structure and thus attracts a relatively large view factor.

The low emissivity coating of the present disclosure may be an explicit coating or doping of the thermal barrier coating, e.g. Gadolinium to form Gadolinium Oxide or other oxide forming species. Alternatively, the low emissivity coating may be a surface treatment applied to the spar 56, 256 to increase its reflectivity, e.g. polishing.

In effect, the combination of the reflectivity, emissivity, and transmissivity of a surface is equal to 1. The reflectivity is the proportion of heat (radiation) reflected and therefore not absorbed by the surface, the transmissivity is the amount passed through the surface and continues through the coating contributing to the heating of the component feature you want to protect, and the emissivity is the proportion absorbed and reradiated back out. In effect the higher the reflectivity the better.

In the illustrative embodiment, the thermal barrier shield 16 is a high-temperature capability thermal barrier coating with alloying additions to control transmission of optical and infrared wavelengths and to lower the thermal conductivity of the layer. In some embodiments, the alloying additions may include Gadolinium oxide.

The present disclosure illustrates the options to reduce convective heat transfer into the structure. Any thermal barrier coating with low conductivity and compatibility with the metallic substrate may be appropriate. However, as this feature is not in the gas path and does not influence the aerodynamic performance of the engine, then air-plasma spray thermal barrier coating may be appropriate.

An inter-stage seal and associated support structure may be used with a high pressure turbine nozzle guide vane due to the inter-disc cavity. A support structure may be used for other vane applications e.g. inter mediate pressure turbine stages 1 and 2 etc. but depends on the engine architecture.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly for a gas turbine engine, the turbine vane assembly comprising a ceramic matrix composite vane adapted to conduct hot gases flowing through a primary gas path of the gas turbine engine around the turbine vane assembly during use of the turbine vane assembly, the ceramic matrix composite vane includes an outer wall that defines an outer boundary of the primary gas path, an inner wall spaced apart radially from the outer wall relative to an axis to define an inner boundary of the primary gas path, and an aerofoil that extends between radially and interconnects the outer wall and the inner wall, and the aerofoil is formed to define an interior cavity that extends radially through the aerofoil, a metallic support strut located in the interior cavity formed in the aerofoil and configured to receive force loads applied to the ceramic matrix composite vane by the hot gases during use of the turbine vane assembly, the metallic support strut having an outermost surface that faces the aerofoil, and the outermost surface of the metallic support strut being spaced apart from the aerofoil at all locations radially between the outer boundary and the inner boundary of the primary gas path to define a cooling channel between the metallic support strut and the aerofoil, and a thermal barrier shield coupled to the outermost surface of the metallic support strut and spaced apart from the aerofoil at all locations radially between the outer boundary and the inner boundary of the primary gas path to reduce an amount of heat transfer to the metallic support strut from radiant, conductive, and convective heating caused by a temperature difference between the ceramic matrix composite vane and the metallic support strut during use of the turbine vane assembly, wherein the thermal barrier shield is a thermal barrier coating, and wherein the turbine vane assembly further includes a seal that engages the aerofoil and the metallic support strut to block fluid from flowing in the cooling channel.

2. The turbine vane assembly of claim 1, wherein the aerofoil includes an outer surface that defines a leading edge, a trailing edge, a pressure side, and a suction side of the aerofoil.

3. The turbine vane assembly of claim 1, wherein the thermal barrier coating comprises gadolinium oxide.

4. The turbine vane assembly of claim 1, wherein the thermal barrier coating is a low emissivity coating that has a reflectivity between 0.5 and 1.

5. The turbine vane assembly of claim 1, wherein the thermal barrier coating is a low emissivity coating that has a reflectivity between 0.6 and 0.95.

6. The turbine vane assembly of claim 1, wherein the outer wall, the inner wall, and the aerofoil of the ceramic matrix composite vane are integrally formed from ceramic matrix composite materials such that the outer wall, the inner wall, and the aerofoil cooperate to form an integral, one-piece component.

7. A turbine vane assembly for a gas turbine engine, the turbine vane assembly comprising a vane that includes an outer wall having a radial inner surface, an inner wall having a radial outer surface, and an aerofoil that extends between radially and interconnects the outer wall and the inner wall, and the aerofoil is formed to define an interior cavity that extends radially through the aerofoil, a support strut located in the interior cavity formed in the aerofoil, the support strut spaced apart from the aerofoil at all locations radially between the radial inner surface and the radial outer surface to define a cooling channel between the support strut and the aerofoil, a thermal barrier shield located in the cooling channel and spaced apart from the aerofoil at all locations radially between the radial inner surface and the radial outer surface, wherein the thermal barrier shield extends radially entirely between the radial inner surface and the radial outer surface, and wherein the support strut includes a spar that extends radially into the interior cavity and a load transfer feature that extends circumferentially away from the spar and engages the aerofoil at a location radially outward of the radial inner surface.

8. The turbine vane assembly of claim 7, wherein the thermal barrier shield extends radially outward beyond the radial inner surface and radially inward beyond the radial outer surface.

9. The turbine vane assembly of claim 7, wherein the thermal barrier shield is coupled to the spar of the support strut.

10. The turbine vane assembly of claim 7, wherein the support strut is completely solid and has a continuous outermost surface that it is formed without holes.

11. The turbine vane assembly of claim 7, wherein the thermal barrier shield is continuous and formed without holes that extend either axially or circumferentially through the thermal barrier shield.

12. A turbine vane assembly for a gas turbine engine, the turbine vane assembly comprising a vane that includes an outer wall having a radial inner surface, an inner wall having a radial outer surface, and an aerofoil that extends between radially and interconnects the outer wall and the inner wall, and the aerofoil is formed to define an interior cavity that extends radially into the aerofoil, a support strut located in the interior cavity formed in the aerofoil, the support strut spaced apart from the aerofoil at all locations radially between the radial inner surface and the radial outer surface to define a cooling channel between the support strut and the aerofoil, a thermal barrier shield located in the cooling channel and spaced apart from the aerofoil at all locations radially between the radial inner surface and the radial outer surface, wherein the thermal barrier shield extends radially entirely between the radial inner surface and the radial outer surface, and a seal that engages the aerofoil and the support strut to block fluid from flowing into the cooling channel.

13. A method of making a turbine vane assembly, the method comprising providing a metallic support strut, a ceramic matrix composite aerofoil formed to define an interior cavity therein, an outer wall, and an inner wall, coating an outermost surface of the metallic support strut with a thermal barrier coating to define an insulated region of the metallic support strut, locating the ceramic matrix composite aerofoil radially between the outer wall and the inner wall relative to an axis, and arranging the metallic support strut in the interior cavity of the ceramic matrix composite aerofoil such that the insulated region of the metallic support strut extends radially at least between the outer wall and the inner wall and the thermal barrier coating is spaced apart from the ceramic matrix composite aerofoil at all locations in the insulated region, and arranging a seal between the metallic support strut and the ceramic matrix composite aerofoil to block fluid from flowing into the cooling channel.

14. The method of claim 13, further comprising doping the thermal barrier coating with gadolinium to form gadolinium oxide.

* * * * *